US009818414B2

(12) United States Patent
Phielipp

(10) Patent No.: US 9,818,414 B2
(45) Date of Patent: Nov. 14, 2017

(54) DIALOGUE SYSTEM WITH AUDIO WATERMARK

(71) Applicant: Intel Corporation, Santa Clara, CA (US)

(72) Inventor: Mariano J. Phielipp, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 102 days.

(21) Appl. No.: 14/731,315

(22) Filed: Jun. 4, 2015

(65) Prior Publication Data

US 2016/0358614 A1 Dec. 8, 2016

(51) Int. Cl.
*G10L 21/00* (2013.01)
*G10L 19/00* (2013.01)
*G10L 19/018* (2013.01)
*G10L 15/22* (2006.01)

(52) U.S. Cl.
CPC ............ *G10L 19/018* (2013.01); *G10L 15/22* (2013.01); *G10L 2015/225* (2013.01)

(58) Field of Classification Search
None
See application file for complete search history.

(56) References Cited

U.S. PATENT DOCUMENTS

| 7,224,819 | B2 * | 5/2007 | Levy ................. G06F 17/30876 348/E7.061 |
| 8,055,505 | B2 * | 11/2011 | Tachibana ............. G10L 19/097 704/273 |
| 8,081,757 | B2 * | 12/2011 | Voessing ............... G10L 19/018 380/238 |
| 9,412,387 | B2 * | 8/2016 | Davis .................... H04W 4/023 |
| 9,620,133 | B2 * | 4/2017 | Yang ..................... G10L 19/018 |
| 2003/0018479 | A1 | 1/2003 | Oh et al. |
| 2005/0234728 | A1 * | 10/2005 | Tachibana ............. G10L 19/097 704/273 |
| 2006/0212710 | A1 * | 9/2006 | Baum ................... G06T 1/0028 713/176 |
| 2011/0173208 | A1 | 7/2011 | Vogel |
| 2013/0151855 | A1 * | 6/2013 | Petrovic ............. H04N 21/8358 713/176 |
| 2013/0151856 | A1 * | 6/2013 | Petrovic ............. H04N 1/00846 713/176 |
| 2013/0152210 | A1 * | 6/2013 | Petrovic .................. G06F 21/10 726/26 |
| 2013/0197913 | A1 | 8/2013 | Bilobrov |

(Continued)

OTHER PUBLICATIONS

Bender et al. "Techniques for data hiding"; IBM Systems Journal, vol. 35, Nos. 3&4, 1996, pp. 313-336 (24 pages).

(Continued)

*Primary Examiner* — Satwant Singh
(74) *Attorney, Agent, or Firm* — Green, Howard & Mughal LLP

(57) ABSTRACT

Described is an apparatus which comprises: first logic to generate a first audio data and to embed the first audio data with a watermark to generate an embedded data; a speaker to output the embedded data as a first audible audio; a microphone to receive a second audible audio; and second logic to check the second audible audio for the watermark, and if the second audible audio has the watermark embedded in the first audio data, generate a first message, else generate a second message.

20 Claims, 6 Drawing Sheets

(56) References Cited

U.S. PATENT DOCUMENTS

| | | | |
|---|---|---|---|
| 2013/0259211 A1 | 10/2013 | Vlack et al. | |
| 2014/0026159 A1* | 1/2014 | Cuttner | G06Q 30/0241 |
| | | | 725/19 |
| 2014/0142958 A1 | 5/2014 | Sharma et al. | |
| 2015/0154972 A1* | 6/2015 | Yang | G10L 19/018 |
| | | | 704/500 |
| 2016/0019901 A1* | 1/2016 | Topchy | G10L 19/018 |
| | | | 704/500 |
| 2016/0210971 A1* | 7/2016 | Adsumilli | G10L 19/018 |
| 2017/0032796 A1* | 2/2017 | Baum | G10L 19/018 |
| 2017/0116996 A1* | 4/2017 | Craven | G10L 19/018 |

OTHER PUBLICATIONS

Chen, "Quantization index modulation: a class of provably good methods for digital watermarking and information embedding" Dept. of Electr. Eng. & Comput. Sci., MIT, Cambridge, MA, USA; IEEE Transactions on Information Theory, vol. 47 Iss. 4 (Abstract only).

Cho, "Echo Watermarking in Sub-band Domain" Lecture Notes in Computer Science vol. 2939, 2004, pp. 447-455 (Abstract only) http://link.springer.com/chapter/10.1007%2F9783540246244_35.

Cvejic et al., "Increasing Robustness of LSB Audio Steganography by Reduced Distortion LSB Coding" MediaTeam, Information Processing Laboratory, University of Oulu, Finland http://www.mediateam.ouluf/publications/pdf/618.pdf, (10 pages).

International Search Report for PCT Application No. PCT/US16/30589 dated Aug. 24, 2016, 5 pages.

* cited by examiner

| ID | Watermark |
|---|---|
| Device 1 | WM-1 |
| Device 2 | WM-2 |
| Device 3 | WM-3 |
| ... | ... |
| Device N | WM-N |

DIALOGUE SYSTEM WITH AUDIO WATERMARK

BACKGROUND

Various wearable computing devices (e.g. smart watches) and non-wearable devices (e.g., Amazon Echo® by Amazon.com®) operate by voice control. Here, such devices are referred to as dialogue devices and/or systems. For example, iPhone® manufactured by Apple Inc. uses Siri® that provides a voice based user interface to answer questions, make recommendations, etc. One common problem with dialogue devices and/or systems is the synchronization and time delays that occur in speech synthesis and speech recognition.

For example, dialogue devices and/or systems may "talk to themselves" due to synchronization and time delay issues. Such problems are also referred to as self-hearing problems. A dialogue device and/or system "talks to itself" or self-hears when its own audio response appears as a command to itself (i.e., the dialogue device) resulting in improper subsequent response or other failures by the dialogue device.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 4 illustrates a look-up table to map various devices to their respective watermarks, according to some embodiments of the disclosure.

DETAILED DESCRIPTION

Figure 1:
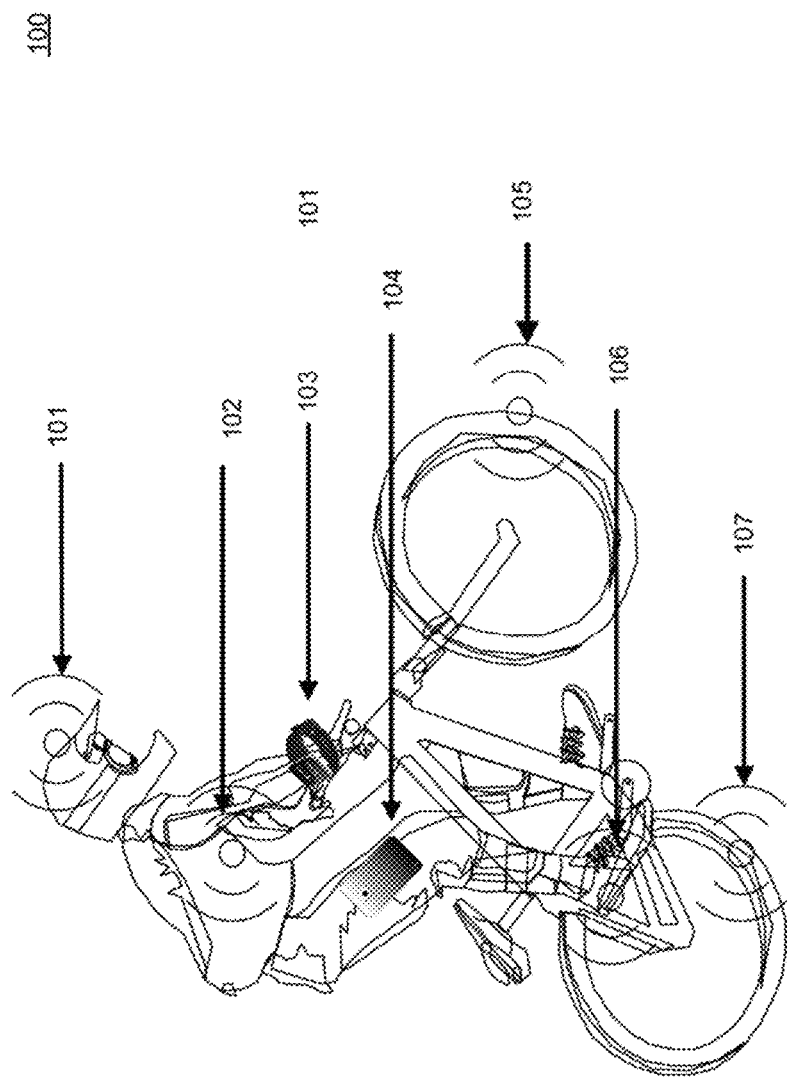
FIG. 1 illustrates an ensemble of wearable devices including one or more dialogue device/system with apparatus to avoid self-hearing, according to some embodiments of the disclosure.

In some embodiments, an apparatus and method is provided to avoid the self-hearing problems experienced by a dialogue device/system by embedding a watermark in the audio generated by the dialogue device/system. As such, the dialogue device/system can become aware of its own audio compared to an audio generated by other sources. Being aware of its own audio avoids the issue of talking to itself (i.e., self-hearing).

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about," generally refer to being within +/−20% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors in various circuits, modules, and logic blocks are metal oxide semiconductor (MOS) transistors, which include drain, source, gate, and bulk terminals. The transistors also include Tri-Gate and FinFET transistors, Gate All Around Cylindrical Transistors, Tunneling FET (TFET), Square Wire, or Rectangular Ribbon Transistors or other devices implementing transistor functionality like carbon nano tubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, eFET, etc., may be used without departing from the scope of the disclosure.

FIG. 1 illustrates ensemble 100 of wearable devices including one or more dialogue device/systems with apparatus to avoid self-hearing, according to some embodiments of the disclosure. In this example, ensemble 100 is on a person and his/her ride (here, a bicycle). However, the embodiments are not limited to such. Other scenarios of wearable devices and their usage may work with various embodiments.

For example, dialogue devices/systems can be embedded into some other products (e.g., walls in a house, vehicles, clothes, etc.) and can be controlled using a controller. The dialogue device/system of some embodiments can also be part of a wearable device. The term "wearable device" (or wearable computing device) generally refers to a device coupled to a person. For example, devices (such as sensors, cameras, speakers, microphones (mic), smartphones, smart watches, etc.) which are directly attached on a person or on the person's clothing are within the scope of wearable devices.

In some examples, wearable computing devices may be powered by a main power supply such as an AC/DC power outlet. In some examples, wearable computing devices may be powered by a battery. In some examples, wearable computing devices may be powered by a specialized external source based on Near Field Communication (NFC). The specialized external source may provide an electromagnetic field that may be harvested by circuitry at the wearable computing device. Another way to power the wearable computing device is electromagnetic field associated with wireless communication, for example, WLAN transmissions. WLAN transmissions use far field radio communications that have a far greater range to power a wearable computing device than NFC transmission. WLAN transmissions are commonly used for wireless communications with most types of terminal computing devices.

For example, the WLAN transmissions may be used in accordance with one or more WLAN standards based on Carrier Sense Multiple Access with Collision Detection (CSMA/CD) such as those promulgated by the Institute of Electrical Engineers (IEEE). These WLAN standards may be based on CSMA/CD wireless technologies such as Wi-Fi™ and may include Ethernet wireless standards (including progenies and variants) associated with the IEEE 802.11-2012 Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11").

Continuing with the example of FIG. 1, ensemble 100 of wearable devices includes device 101 (e.g., camera, microphone, and/or dialogue device/system) on a helmet, device 102 (e.g., dialogue device/system, blood pressure sensor, gas sensor, pulse sensor, and/or microphone, etc.) on the person's arm, device 103 (e.g., a smart watch that can function as a terminal controller or a device to be controlled), device 104 (e.g., a smart phone and/or tablet in a pocket of the person's clothing), device 105 (e.g., pressure sensor to sense or measure pressure of a tire, or gas sensor to sense nitrogen air leaking from the tire), device 106 (e.g., an accelerometer to measure paddling speed), device 107 (e.g., another pressure sensor for the other tire). In some embodiments, ensemble 100 of wearable devices has the capability to communicate by wireless energy harvesting mechanisms or other types of wireless transmission mechanisms.

In some embodiments, device 102 comprises a dialogue device/system (e.g., a smart watch or phone) which includes a first logic to generate a first audio data and to embed the first audio data with a watermark to generate an embedded data. In some embodiments, the apparatus comprises a speaker to output the embedded data as a first audible audio. For example, the dialogue device/system generates an audio informing a user of the current time and temperature such that the audio includes one or more in-audible watermark(s) embedded in it (i.e., in-audible to a human being).

In some embodiments, the dialogue device/system comprises a microphone to receive a second audible audio. For example, the dialogue device/system receives a command to provide driving directions to a place. In some embodiments, the dialogue device/system comprises a second logic to check the second audible audio for the watermark. For example, dialogue device/system checks the audio command (which in this example was the request to provide driving directions to a place) for the embedded watermark. In some embodiments, if the second audible audio has the same watermark which was embedded in the first audio data, a first message is generated, else a second message is generated.

For example, in this case the audio command (i.e., the second audible audio) is not generated by the dialogue device/system and hence the audio command may not have the expected watermark. In that case, the audio command is processed by the dialogue device/system and a corresponding response is generated (e.g., driving directions). In a case where the second audible audio is the same as the first audible audio (in this example, audio informing a user of the current time and temperature), and if the second logic finds the same embedded watermark in the second audible audio then the dialogue device/system generates a first message (e.g., a message internal to the dialogue device/system that the second audible audio is not meant for the dialogue device/system to act on, and so can be ignored). As such, self-hearing problem can be avoided.

Figure 2:
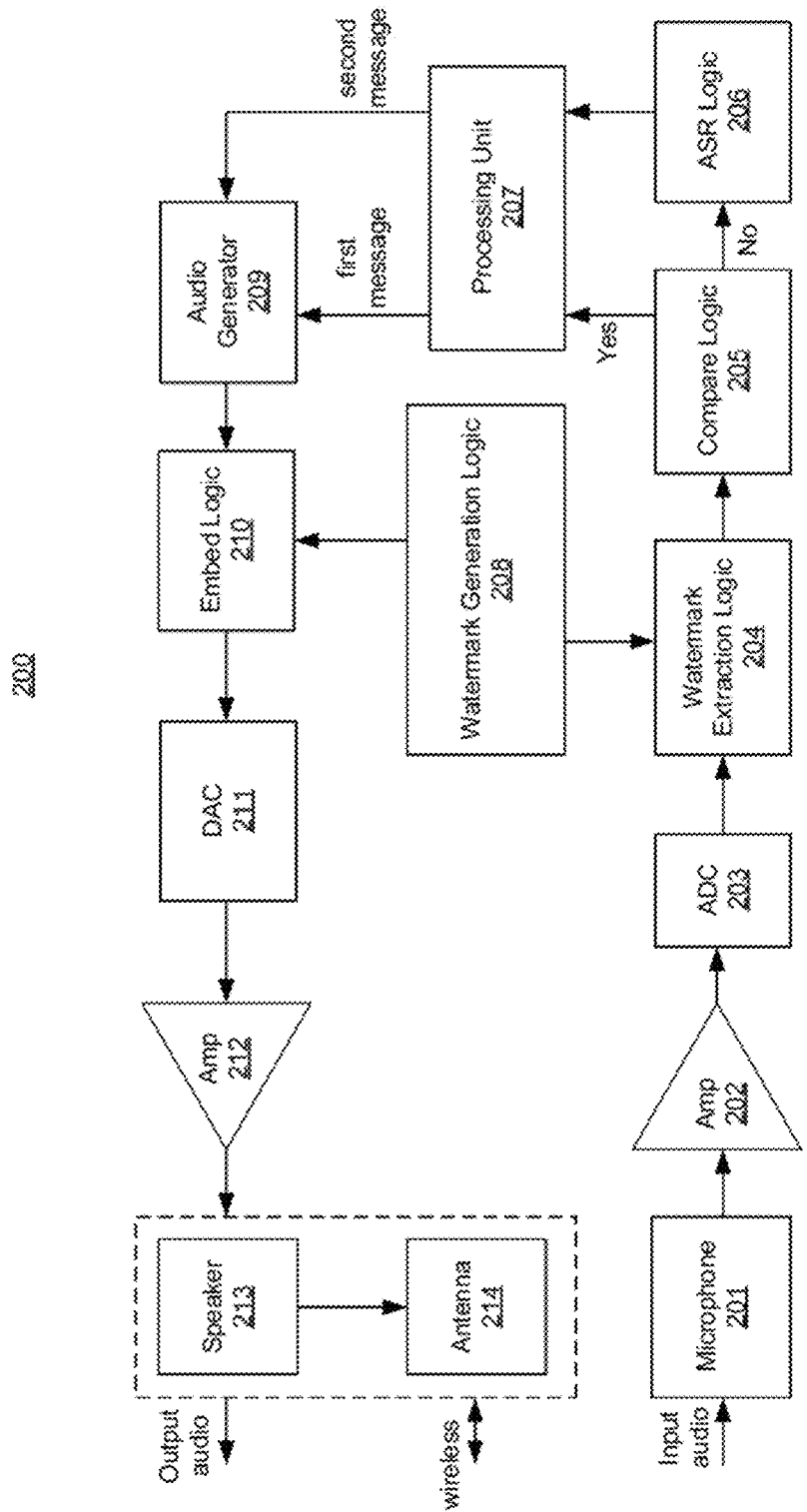
FIG. 2 illustrates a dialogue device/system with apparatus to avoid self-hearing, according to some embodiments of the disclosure.

FIG. 2 illustrates dialogue device/system 200 with apparatus to avoid self-hearing, according to some embodiments of the disclosure. It is pointed out that those elements of FIG. 2 having the same reference numbers (or names) as the elements of any other figure can operate or function in any manner similar to that described, but are not limited to such.

In some embodiments, dialogue device/system 200 comprises Microphone 201, input amplifier (Amp) 202, Analog-to-Digital Converter (ADC) 203, Watermark Extraction Logic 204, Compare Logic 205, Automatic Speech Recognition (ASR) Logic 206, Processing Unit 207, Watermark Generation Logic 208, Audio Generator 209, Embed Logic 210, Digital-to-Analog Converter (DAC) 211, output Amp 212, Speaker 213, and Antenna 214. While various logic blocks are shown as separate blocks, the logic blocks can be combined in any suitable manner. For example, Amp 202, ADC 203, Watermark Extraction Logic 204, Compare Logic 205, ASR Logic 206, Watermark Generation Logic 208, Audio Generator 209, Embed Logic 210, DAC 211, and Amp 212 can be combined within Processing Unit 207.

In some embodiments, Microphone 201 receives an Input Audio (e.g., a command spoken by a user or another device) for processing by dialogue device/system 200. Microphone 201 can be any suitable device that converts sound in air into an electrical signal. For example, Microphone 201 is one of lavalier microphone, wireless microphone, contact microphone, parabolic microphone, or noise-canceling microphone.

In some embodiments, Amp 202 receives the electrical signal from Microphone 201 and amplifies it for further processing. Amp 202 can be any suitable amplifier for amplifying the electrical signal. In some embodiments, Amp 202 amplifies the signal received from Antenna 214 (e.g., when Microphone 201 is a wireless microphone). Any suitable amplifier may be used for implementing Amp 202. In some embodiments, output of Amp 202 is an analog signal which is converted to a corresponding digital representation by ADC 203. An analog signal is any continuous signal which is continuous in both time and amplitude such that the time varying feature (variable) of the signal is a representation of some other time varying quantity.

Any suitable ADC may be used to implement ADC 203. For example, ADC 203 is one of: direct-conversion ADC (for flash ADC), successive-approximation ADC, ramp-compare ADC, Wilkinson ADC, integrating ADC, delta-encoded ADC or counter-ramp, pipeline ADC (also called subranging quantizer), sigma-delta ADC (also known as a delta-sigma ADC), time-interleaved ADC, ADC with intermediate FM stage, or time-stretch ADC.

In some embodiments, Watermark Extraction Logic 204 receives a digital audio stream (e.g., output of ADC 203) and extracts a portion of the stream to check for a watermark. A digital signal or digital audio stream is a physical signal that s representation of a sequence of discrete values (a quantified discrete-time signal) of a digitized analog signal. In some embodiments, a watermark is placed in the first block (of predetermined number of bits) of the digital audio stream and so Watermark Extraction Logic 204 extracts the first block to extract the watermark. In some embodiments, the watermark is a random number of a fixed size at a fixed location of the audio stream and Watermark Extraction Logic 204 extracts that random number from the digital audio stream.

In some embodiments, the watermark is a random number of sufficient length (e.g., sufficient number of digits to provide protection from hacks) at a predetermined location of the audio stream and Watermark Extraction Logic 204 extracts that prime number from the digital audio stream. In some embodiments, the watermark is a prime number of fixed digits at a predetermined location of the audio stream and Watermark Extraction Logic 204 extracts that prime number from the digital audio stream. In some embodiments, a more complicated extraction algorithm may be used. For example, Watermark Extraction Logic 204 may decode the digital audio stream using a sophisticated decoding algorithm to decode an encoded watermark. In some embodiments, Watermark Extraction Logic 204 may use a phase decoding technique to decode digital audio stream. Any suitable decoding/encoding schemes may be used for embedding and extracting the watermark.

In some embodiments, Compare Logic 205 compares the extracted watermark with a reference watermark. In some embodiments, the reference watermark is generated by Watermark Generation Logic 208. In some embodiments, the reference watermark is a prime number of fixed number of digits/bits, a random number of fixed number of digits, a random number of sufficient number of digits to provide protection from hacks, etc. In some embodiments, Compare Logic 205 comprises exclusive-OR (XOR) logic gates to compare the extracted watermark against the reference watermark. In other embodiments other suitable circuits may be used to compare two blocks of data to determine whether the watermark exists in the digital audio stream. In some embodiments, the output of Compare Logic 205 indicates whether a watermark exists in the digital audio stream. If the watermark does not exist, the digital audio stream is processed by ASR Logic 206, according to some embodiments. If the watermark exists, the digital audio stream is processed by Processing Unit 207 (for example, the digital audio stream is discarded), in accordance with some embodiments.

In some embodiments, ASR Logic 206 uses speaker-independent speech recognition. In some embodiments, ASR Logic 206 uses training where an individual speaker reads sections of text into ASR Logic 206. In some embodiments, ASR Logic 206 is based on Hidden Markov Models (HMM) which are statistical models that output a sequence of symbols or quantities. In some embodiments, ASR Logic 206 uses deep learning techniques for speech recognition. For example, ASR Logic 206 is based on a Deep Neural Network (DNN) which models complex non-linear relationships. In other embodiments, other types of models may be used for speed recognition. For example, models based on Shallow Neural Networks (SNNs), Recurrent Neural Networks (RNNs), Time Delay Neural Networks (TDNNs), etc. can be used by ASR Logic 206 for speech recognition.

In some embodiments, Processing Unit 207 generates a digital message to provide a response to a command received by Microphone 201. In some embodiments, Processing Unit 207 receives the output of Compare Logic 205 and based on whether a watermark was found in the digital audio stream, Processing Unit 207 determines how to process the digital audio stream. For example, if Compare Logic 205 indicates that a watermark was found, then Processing Unit 207 may discard the digital audio stream because it is based on the Output Audio of dialogue device/system 200, according to some embodiments. In some embodiments, if Compare Logic 205 indicates that a watermark was found, then Processing Unit 207 may generate a first message and that first message is converted to an audio to inform a user that dialogue device/system 200 incurred a problem processing the Input audio. In other embodiments, Processing Unit 207 may take other suitable actions when Compare Logic 205 indicates that a watermark was found.

In some embodiments, Processing Unit 207 processes the output of ASR Logic 206 and generates a second message for output by Speaker 213. For example, Processing Unit 207 processes the digital version of Input audio because it does not have any watermark embedded in it and provides the user with the answer it requested (e.g., directions to a place, date, time, or other requests).

In some embodiments, Audio Generator 209 receives the first/second message and generates a bit-stream of audio data for outputting via Speaker 213. In some embodiments, Embed Logic 210 embeds a watermark to the audio data generated by Audio Generator 209. In some embodiments, the watermark is generated by Watermark Generation Logic 208. In some embodiments, Watermark Generation Logic 208 generates a watermark which is a random number of a fixed size at a fixed location of the audio stream. Watermark Generation Logic 208 generates a watermark which is a prime number (e.g., 609821). In some embodiments, Embed Logic 210 embeds the watermark in the output of Audio Generator 209 using phase based modulation. For example, the watermark can be embedded using a phase coding technique. In some embodiments, Embed Logic 210 embeds the watermark using the phase spectrum of every first block of data output from Audio Generator 209. For example, Embed Logic 210 substitutes a phase of an initial audio segment with a reference phase which represents the hidden data (i.e., watermark).

In some embodiments, Embed Logic 210 embeds the watermark at the beginning of the audio stream (e.g., the first block of the audio stream). In some embodiments, Embed Logic 210 embeds the watermark at the end of the audio stream to avoid self-hearing. In other embodiments, Embed Logic 210 embeds the watermark in different portions of the audio stream to avoid self-hearing. For example, Embed Logic 210 scrambles the watermark within the audio stream so that the watermark is safe guarded (i.e., protected from malicious hacks). In such an example, Watermark Extraction Logic 204 is aware of the unscrambling process to extract the scrambled watermark.

In some embodiments, the output of Embed Logic 210, which is the audio stream with embedded watermark, is converted to an analog representation using DAC 211. In some embodiments, DAC 211 is a pulse-width modulator (PCM). In some embodiments, DAC 211 is an oversampling DAC or interpolating DAC such as sigma-delta DAC. In other embodiments, other types of DAC may be used for implementing DAC 211. For example, DAC 211 is one of switched resistor DAC, switched current source DAC, switched capacitor DAC, R-2R binary weighted DAC, Successive-Approximation or Cyclic DAC, thermometer-coded DAC, etc. The output DAC 211 is an analog signal which is amplified by Amp 212, according to some embodiments.

In some embodiments, Amp 212 is an audio amplifier that amplifies lower-power audio signals to a level suitable for driving Speaker 213. Any known audio amplifier may be used for implementing Amp 212. For example, Amp 212 may be a Class-A, Class-B, Class A/B or other type of Amp 212. In some embodiments, Speaker 213 receives the amplified output from Amp 212 and generates an Output audio. Any suitable speaker may be used to implement Speaker 213. In some embodiments, Speaker 213 is one or more of a loud speaker, woofer, mid-range speaker, tweeter, piezoelectric speaker, magnetostatic speaker, thermoacoustic speaker, transparent ionic condition speaker, etc. In some embodiments, Speaker 213 is a wireless speaker with Antenna 214. In some embodiments, Antenna 214 receives the Input audio and provides it to Amp 202. For example, Microphone 201 is a wireless microphone having Antenna 214.

In some embodiments, Antenna(s) 214 are provided as part of dialogue device/system 200 to communicate with other devices. In some embodiments, Antenna(s) 214 may comprise one or more directional or omnidirectional antennas, including monopole antennas, dipole antennas, loop antennas, patch antennas, microstrip antennas, coplanar wave antennas, or other types of antennas suitable for transmission of Radio Frequency (RF) signals. In some multiple-input multiple-output (MIMO) embodiments, Antenna(s) 214 are separated to take advantage of spatial diversity.

Figure 3:
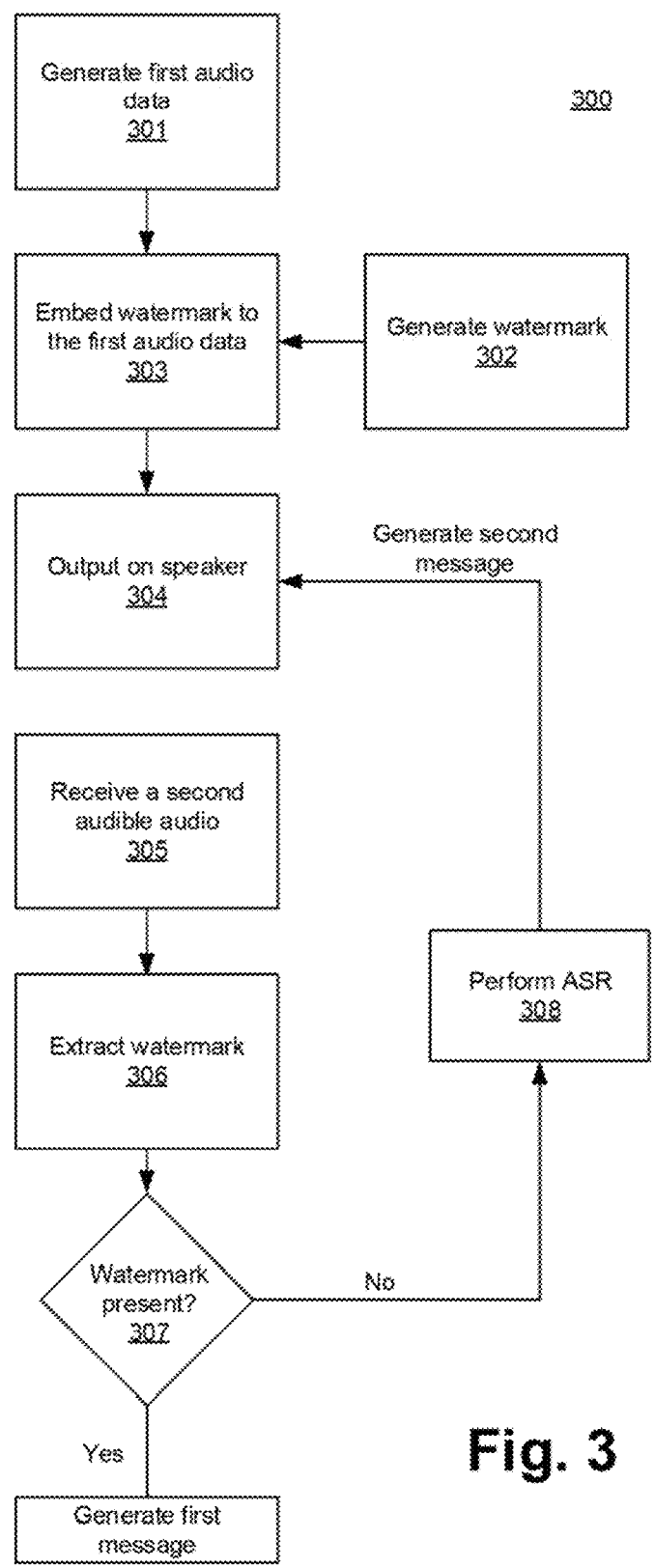
FIG. 3 illustrates a flowchart of a method for avoiding self-hearing, according to some embodiments of the disclosure.

FIG. 3 illustrates flowchart 300 of a method for avoiding self-hearing, according to some embodiments of the disclosure. It is pointed out that those elements of FIG. 3 having the same reference numbers (or names) as the elements of any other figure can operate or function in any manner similar to that described, but are not limited to such.

Although the blocks in the flowchart with reference to FIG. 3 are shown in a particular order, the order of the actions can be modified. Thus, the illustrated embodiments can be performed in a different order, and some actions/blocks may be performed in parallel. Some of the blocks and/or operations listed in FIG. 3 are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 301, first audio data is generated by Processing Unit 207 and Audio Generator 209 of dialogue device/system 200 in response to a command by a user or another device. At block 302, Watermark Generation Logic 208 generates a watermark. In some embodiments, the watermark is generated by phase based modulation using phase spectrum of every first block of the first audio data. In other embodiments, watermark may be generated by other methods. For example, Least Significant Bit (LSB) coding, echo watermarking, steganography, patchwork technique, Quantization Index Modulation (QIM), spread spectrum modulation (e.g., spread spectrum watermarking (SSW), etc. can be used for generating the watermark.

At block 303, the watermark is embedded in the first audio data by Embed Logic 210 to avoid self-hearing. In some embodiments, the phase of an initial audio segment is substituted with a reference phase which represented the hidden data (i.e., the watermark). In phase coding method, the phase of an initial audio segment is substituted with a reference phase that represents the data. The phase of subsequent segments is adjusted in order to preserve the relative phase between segments. Any suitable watermark generation scheme (e.g., LSB coding, QIM, SSW, etc.) can be used for embedding the watermark in the audio data. The embedded audio data is then converted to an analog signal by DAC 211. The output of DAC 211 is then amplified by Amp 212. At block 304, the amplified output is then output as audio by Speaker 213. To avoid self-hearing by dialogue device/system 200, dialogue device/system 200 checks for the embedded watermark in the input audio, and if it detects the watermark, dialogue device/system 200 knows that it can discard or not process the Input audio because it is the audio generated by dialogue device/system 200 itself.

At block 305, dialogue device/system 200 receives a second audible audio via Microphone 201. The second audible audio is then amplified by Amp 202 which generates an amplified analog signal. In some embodiments, the output of Amp 202 is converted to a digital stream by ADC 203. At block 306, Watermark Extraction Logic 204 decodes the digital stream to extract a watermark from a predetermined location(s) of the decoded digital stream or directly from the digital stream. For example, Watermark Extraction Logic 204 extracts the watermark from a first block of data of the digital stream. In some embodiments, Watermark Extraction Logic 204 extracts the watermark from a location (fixed or scrambled) where the watermark is expected to be embedded by Embed Logic 210.

At block 307, Compare Logic 205 makes a determination whether the expected watermark is extracted. If the watermark is present in the digital stream and if the extracted watermark is the expected watermark (i.e., the watermark embedded by Embed Logic 210) then a first message is generated (e.g., an internal message is generated indicating that no further processing of the digital stream needs to happen). As such, self-hearing is avoided. If the no watermark is present in the expected data location of the digital stream, ASR is performed by ASR Logic 206 at block 308 and a second message is generated (e.g., a message in response to the input second audible audio). The process then proceeds to block 304 for output by Speaker 213.

FIG. 4 illustrates look-up table 400 to map various devices to their respective watermarks, according to some embodiments of the disclosure. It is pointed out that those elements of FIG. 4 having the same reference numbers (or names) as the elements of any other figure can operate or function in any manner similar to that described, but are not limited to such.

In some embodiments, dialogue device/system 200 includes look-up table 400 to map the watermarks of various devices. Here, each device is mapped to a corresponding watermark (WM). For example, Device 1 is mapped to WM-1, Device 2 is mapped to WM-2, Device 3 is mapped to WM-3, and Device N is mapped to WM-3, where 'N' is an integer greater than 3. In some embodiments, devices in look-up table 400 have embedded their respective watermarks in predetermined locations (fixed or scrambled) of the digital stream of data so that Watermark Extraction Logic 204 knows from where to extract the embedded watermarks.

In some cases, the outputs of one dialogue device/system can cause another dialogue device/system to receive an unintended instruction/command. In these cases, the receiving dialogue device/system may perform a process based on the unintended command from another device as opposed to from a user. For example, multiple robots talking with the same human-like synthesized audio can cause self-hearing problems. In these cases, dialogue device/systems may end up talking to one another causing improper output audible signals. This problem is referred to here as "tribal self-hearing". To avoid such tribal self-hearing, in some embodiments, dialogue device/system 200 within an ensemble of devices (such as ensemble 100) maintain look-up table 400 that is used to map watermarks for different devices within the ensemble.

The process of FIG. 3 is then performed in the same way except for some modifications. For example, in some embodiments, at block 306, the watermark from expected location is extracted and compared with watermarks in loop-up table 400. If a watermark is found, the process ends, else the process proceeds to block 308.

Figure 5:
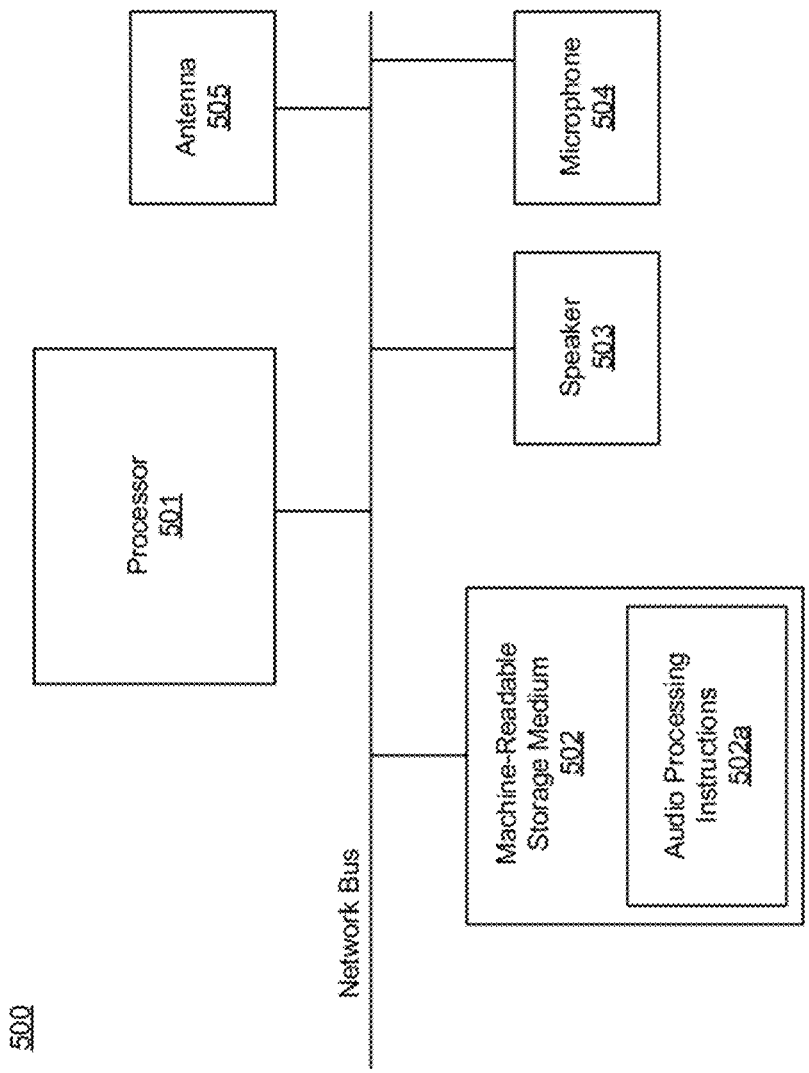
FIG. 5 illustrates a dialogue device/system with machine readable storage medium having instructions to perform an operation for avoiding self-hearing, according to some embodiments of the disclosure.

FIG. 5 illustrates a dialogue device/system 500 with machine readable storage medium having instructions to perform an operation for avoiding self-hearing, according to some embodiments of the disclosure. It is pointed out that those elements of FIG. 5 having the same reference numbers (or names) as the elements of any other figure can operate or function in any manner similar to that described, but are not limited to such.

In some embodiments, dialogue device/system 500 comprises Processor 501 (e.g., a Digital Signal Processor (DSP), an Application Specific Integrated Circuit (ASCI), a general purpose Central Processing Unit (CPU)), Machine-Readable Storage Medium 502 (also referred to as tangible machine readable medium), Speaker 503 (e.g., Speaker 213), Microphone 504 (e.g., Microphone 201), Antenna 505 (e.g., Antenna 214) and Network Bus 506. In some embodiments, the various logic blocks of dialogue device/system 500 are coupled together via Network Bus 506. Any suitable protocol may be used to implement Network Bus 506. In some embodiments, Machine-Readable Storage Medium 502 includes Audio Processing Instructions 502a for avoiding self-hearing (also referred to as the program software code/instructions) as described with reference to various embodiments and flowcharts.

Program software code/instructions 502a associated with flowchart 300 and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowchart 300 are executed by dialogue device/system 500 (such as shown in FIG. 3).

Referring back to FIG. 5, in some embodiments, the program software code/instructions 502a associated with flowchart 300 are stored in a computer executable storage medium 502 and executed by Processor 501. In some embodiments, look-up table 400 of FIG. 4 is also stored in Machine-readable Storage Medium 502. Here, computer executable storage medium 502 is a tangible machine readable medium that can be used to store program software code/instructions and data that, when executed by a computing device, causes one or more processors (e.g., Processor 501) to perform a method(s) as may be recited in one or more accompanying claims directed to the disclosed subject matter.

The tangible machine readable medium 502 may include storage of the executable software program code/instructions 502a and data in various tangible locations, including for example ROM, volatile RAM, non-volatile memory and/or cache and/or other tangible memory as referenced in the present application. Portions of this program software code/instructions 502a and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions 502a (associated with flowchart 300 and other embodiments) and data can be obtained in their entirety prior to the execution of a respective software program or application by the computing device. Alternatively, portions of the software program code/instructions 502a and data can be obtained dynamically, e.g., just in time, when needed for execution. Alternatively, some combination of these ways of obtaining the software program code/instructions 502a and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media 502 include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine readable medium 502 includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Droid®, or the like, or any other device including a computing device. In one embodiment, processor-based system is in a form of or included within a PDA, a cellular phone, a notebook computer, a tablet, a game console, a set top box, an embedded system, a TV, a personal desktop computer, etc. Alternatively, the traditional communication applications and subsidized application(s) may be used in some embodiments of the disclosed subject matter.

Figure 6:
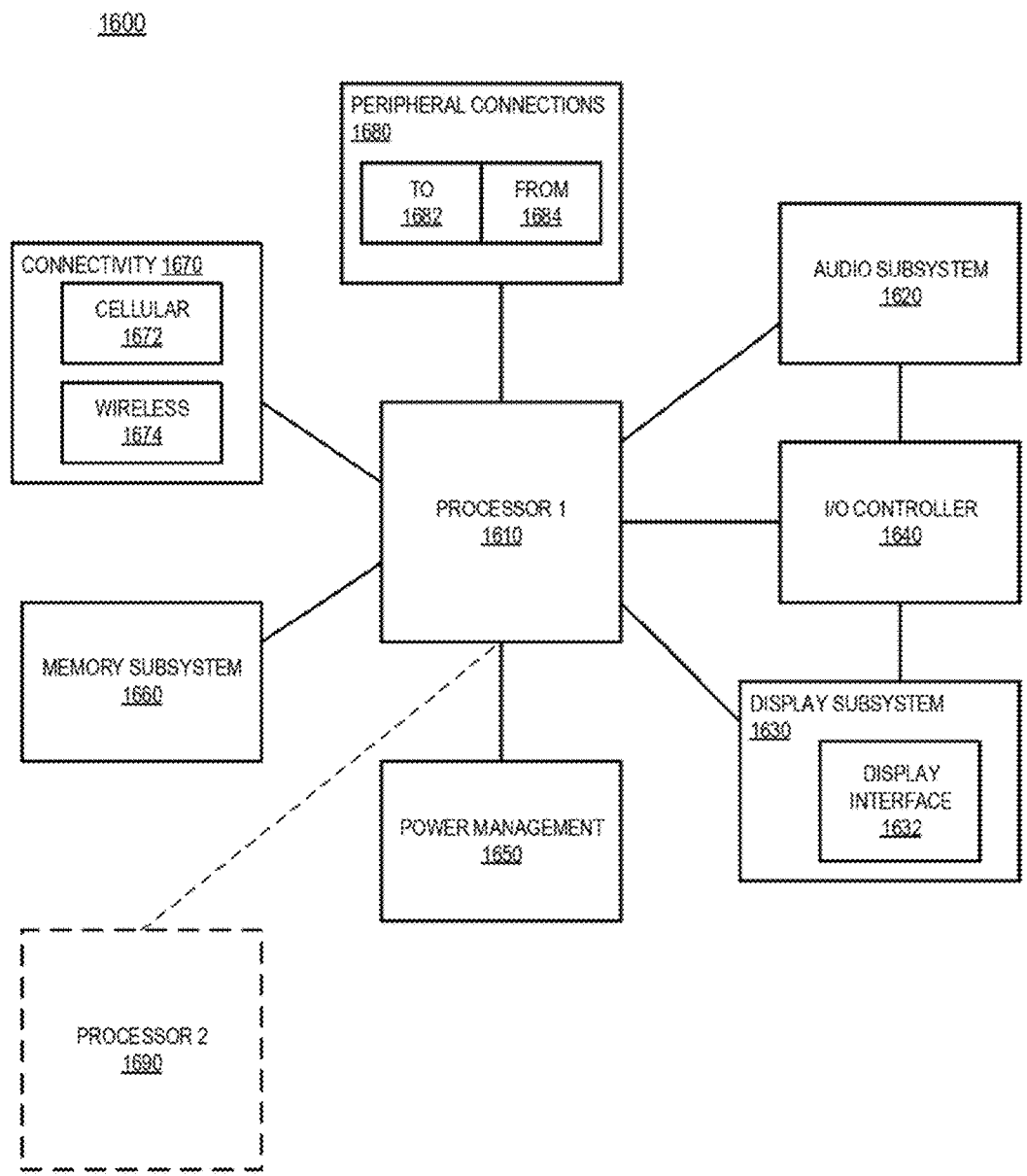
FIG. 6 illustrates a smart device or a computer system or a SoC (System-on-Chip) with apparatus and/or machine executable instructions to avoid self-hearing, according to some embodiments.

FIG. 6 illustrates a smart device or a computer system or a SoC (System-on-Chip) with apparatus and/or machine executable instructions to avoid self-hearing, according to some embodiments. It is pointed out that those elements of FIG. 6 having the same reference numbers (or names) as the elements of any other figure can operate or function in any manner similar to that described, but are not limited to such.

FIG. 6 illustrates a block diagram of an embodiment of a mobile device in which flat surface interface connectors could be used. In some embodiments, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In some embodiments, computing device 1600 includes a first processor 1610 with apparatus and/or machine executable instructions to avoid self-hearing, according to some embodiments discussed. Other blocks of the computing device 1600 may also include the apparatus and/or machine executable instructions to avoid self-hearing, according to some embodiments. The various embodiments of the present disclosure may also comprise a network interface within 1670 such as a wireless interface so that a system embodiment may be incorporated into a wireless device, for example, cell phone or personal digital assistant.

In one embodiment, processor 1610 (and/or processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. In some embodiments, audio subsystem 1620 includes apparatus and/or machine executable instructions to avoid self-hearing, according to some embodiments. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, a machine-readable media is provided having machine executable instructions, that when executed cause one or more processors to perform an operation comprising: generate a first audio data; embed the first audio data with a watermark to generate an embedded data; output the embedded data as a first audible audio via a speaker; and receive a second audible audio and check the second audible audio for the watermark, and if the second audible audio has the watermark embedded in the first audio data, generate a first message, else generate a second message.

In some embodiments, the machine-readable media has further machine executable instructions, that when executed cause the one or more processors to perform a further operation comprising: generate the watermark by applying a phase spectrum of a block of the first audio data. In some embodiments, the block of the first audio data is a first block. In some embodiments, the operation to check the second audible audio for the watermark comprises: extract a watermark from a predetermined block of data of the second audible audio; and compare the extracted watermark against the watermark embedded in the first audio data.

In some embodiments, the first message indicates that the second audible audio is the same as the first audible audio. In some embodiments, the machine-readable media has further machine executable instructions, that when executed cause the one or more processors to perform a further operation comprising: perform automatic speech recognition (ASR) on the second audible audio when the second audible audio does not have the watermark. In some embodiments, the watermark is one of: a random number of variable length, a random number of fixed length, or a prime number. In some embodiments, the one or more processors are part of a wearable device.

In some embodiments, the machine-readable media has further machine executable instructions, that when executed cause the one or more processors to perform a further operation comprising: maintain a table of watermarks to identify watermarks from audios generated by multiple external sources. In some embodiments, the machine-readable media has further machine executable instructions, that when executed cause the one or more processors to perform a further operation comprising: generate one or more messages when a received audio includes one of the watermarks in the table.

In another example, an apparatus is provided which comprises: first logic to generate a first audio data and to embed the first audio data with a watermark to generate an embedded data; a speaker to output the embedded data as a first audible audio; a microphone to receive a second audible audio; and second logic to check the second audible audio for the watermark, and if the second audible audio has the watermark embedded in the first audio data, generate a first message, else generate a second message. In some embodiments, the apparatus comprises third logic to generate the watermark by applying a phase spectrum of a block of the first audio data.

In some embodiments, the second logic extracts a watermark from a predetermined block of data of the second audible audio; and compares the extracted watermark against the watermark embedded in the first audio data. In some embodiments, the first message indicates that the second audible audio is the same as the first audible audio. In some embodiments, the apparatus comprises a digital signal processing logic to perform automatic speech recognition (ASR) on the second audible audio when the second audible audio does not have the watermark. In some embodiments, the watermark is one of: a random number of variable length, a random number of fixed length, or a prime number.

In another example, a system is provided which comprises: a memory; a speaker; a microphone; a processor coupled to the memory, the processor including: first logic to generate a first audio data and to embed the first audio data with a watermark to generate an embedded data, wherein the speaker to output the embedded data as a first audible audio, and wherein the microphone to receive a second audible audio; and second logic to check the second audible audio for the watermark, and if the second audible audio has the watermark embedded in the first audio data, generate a first message, else generate a second message; and a wireless interface for allowing the processor to communicate with another device.

In some embodiments, the processor comprises: third logic to generate the watermark by applying a phase spectrum of a block of the first audio data. In some embodiments, the processor comprises a digital signal processing logic to perform automatic speech recognition (ASR) on the second audible audio when the second audible audio does not have the watermark. In some embodiments, the watermark is one of: a random number of variable length, a random number of fixed length, or a prime number.

In another example, a method is provided which comprises: generating a first audio data; embedding the first audio data with a watermark to generate an embedded data; outputting the embedded data as a first audible audio via a speaker; and receiving a second audible audio and checking the second audible audio for the watermark, and if the second audible audio has the watermark embedded in the first audio data, generate a first message, else generate a second message.

In some embodiments, the method comprises: generating the watermark by applying a phase spectrum of a block of the first audio data. In some embodiments, the block of the first audio data is a first block. In some embodiments, checking the second audible audio for the watermark comprises: extracting a watermark from a predetermined block of data of the second audible audio; and comparing the extracted watermark against the watermark embedded in the first audio data. In some embodiments, the first message indicates that the second audible audio is the same as the first audible audio.

In some embodiments, the method comprises: performing automatic speech recognition (ASR) on the second audible audio when the second audible audio does not have the watermark. In some embodiments, the watermark is one of: a random number of variable length, a random number of fixed length, or a prime number. In some embodiments, the one or more processors are part of a wearable device. In some embodiments, the method comprises: maintaining a table of watermarks to identify watermarks from audios generated by multiple external sources. In some embodiments, the method comprises: generating one or more messages when a received audio includes one of the watermarks in the table.

In another example, an apparatus is provided which comprises: means for generating a first audio data; means for embedding the first audio data with a watermark to generate an embedded data; means for outputting the embedded data as a first audible audio via a speaker; and means for receiving a second audible audio and checking the second audible audio for the watermark, and if the second audible audio has the watermark embedded in the first audio data, generate a first message, else generate a second message.

In some embodiments, the apparatus comprises: means for generating the watermark by applying a phase spectrum of a block of the first audio data. In some embodiments, the block of the first audio data is a first block. In some embodiments, the means for checking the second audible audio for the watermark comprises: means for extracting a watermark from a predetermined block of data of the second audible audio; and means for comparing the extracted watermark against the watermark embedded in the first audio data.

In some embodiments, the first message indicates that the second audible audio is the same as the first audible audio. In some embodiments, the apparatus comprises: means for performing automatic speech recognition (ASR) on the second audible audio when the second audible audio does not have the watermark. In some embodiments, wherein the watermark is one of: a random number of variable length, a random number of fixed length, or a prime number. In some embodiments, the one or more processors are part of a wearable device. In some embodiments, the apparatus comprising: means for maintaining a table of watermarks to identify watermarks from audios generated by multiple external sources. In some embodiments, the apparatus comprises: means for generating one or more messages when a received audio includes one of the watermarks in the table.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

I claim:

1. A machine-readable media is provided having machine executable instructions, that when executed cause one or more processors to perform an operation immune from self-hearing, the operation comprising:
    generate a first audio data;
    embed the first audio data with a watermark to generate an embedded data;
    output the embedded data as a first audible audio via a speaker; and
    receive a second audible audio and check the second audible audio for the watermark, and if the second audible audio has the watermark embedded in the first audio data, generate a first message to avoid self-hearing, else generate a second message in response to the second audible audio.

2. The machine-readable media of claim 1 having further machine executable instructions, that when executed cause the one or more processors to perform a further operation comprising:
generate the watermark by applying a phase spectrum of a block of the first audio data.

3. The machine-readable media of claim 2, wherein the block of the first audio data is a first block.

4. The machine-readable media of claim 1, wherein the operation to check the second audible audio for the watermark comprises:
extract a watermark from a predetermined block of data of the second audible audio; and
compare the extracted watermark against the watermark embedded in the first audio data.

5. The machine-readable media of claim 1, wherein the first message indicates that the second audible audio is the same as the first audible audio.

6. The machine-readable media of claim 1, having further machine executable instructions, that when executed cause the one or more processors to perform a further operation comprising:
perform automatic speech recognition (ASR) on the second audible audio when the second audible audio does not have the watermark.

7. The machine-readable media of claim 1, wherein the watermark is one of:
a random number of variable length,
a random number of fixed length, or
a prime number.

8. The machine-readable media of claim 1, wherein the one or more processors are part of a wearable device.

9. The machine-readable media of claim 1, having further machine executable instructions, that when executed cause the one or more processors to perform a further operation comprising:
maintain a table of watermarks to identify watermarks from audios generated by multiple external sources.

10. The machine-readable media of claim 9, having further machine executable instructions, that when executed cause the one or more processors to perform a further operation comprising:
generate one or more messages when a received audio includes one of the watermarks in the table.

11. An apparatus comprising:
first logic to generate a first audio data and to embed the first audio data with a watermark to generate an embedded data;
a speaker to output the embedded data as a first audible audio;
a microphone to receive a second audible audio; and
second logic to check the second audible audio for the watermark, and if the second audible audio has the watermark embedded in the first audio data, generate a first message to avoid self-hearing, else generate a second message in response to the second audible audio.

12. The apparatus of claim 11 comprises third logic to generate the watermark by applying a phase spectrum of a block of the first audio data.

13. The apparatus of claim 11, wherein the second logic to:
extract a watermark from a predetermined block of data of the second audible audio; and
compare the extracted watermark against the watermark embedded in the first audio data.

14. The apparatus of claim 11, wherein the first message indicates that the second audible audio is the same as the first audible audio.

15. The apparatus of claim 11 comprises a digital signal processing logic to perform automatic speech recognition (ASR) on the second audible audio when the second audible audio does not have the watermark.

16. The apparatus of claim 11, wherein the watermark is one of:
a random number of variable length,
a random number of fixed length, or
a prime number.

17. A system comprising:
a memory;
a speaker;
a microphone;
a processor coupled to the memory, the processor including:
first logic to generate a first audio data and to embed the first audio data with a watermark to generate an embedded data, wherein the speaker to output the embedded data as a first audible audio, and wherein the microphone to receive a second audible audio; and
second logic to check the second audible audio for the watermark, and if the second audible audio has the watermark embedded in the first audio data, generate a first message to avoid self-hearing, else generate a second message in response to the second audible audio; and
a wireless interface to allow the processor to communicate with another device.

18. The system of claim 17, wherein the processor comprises: third logic to generate the watermark by applying a phase spectrum of a block of the first audio data.

19. The system of claim 17, wherein the processor comprises a digital signal processing logic to perform automatic speech recognition (ASR) on the second audible audio when the second audible audio does not have the watermark.

20. The system of claim 17, wherein the watermark is one of: a random number of variable length, a random number of fixed length, or a prime number.

* * * * *